United States Patent
Dussaud et al.

(10) Patent No.: US 7,278,542 B2
(45) Date of Patent: Oct. 9, 2007

(54) FILTERING MEDIUM, METHOD FOR MAKING SAME

(75) Inventors: Joseph Dussaud, Vienne (FR); Leonie Bouvier, Beauvoir de Marc (FR); Fabien Chevalier, Eyzin Pinet (FR)

(73) Assignee: Ahlstrom Research and Services, Pont Eveque (FR)

( * ) Notice: Subject to any disclaimer, the term of this patent is extended or adjusted under 35 U.S.C. 154(b) by 365 days.

(21) Appl. No.: 10/365,138

(22) Filed: Feb. 12, 2003

(65) Prior Publication Data

US 2003/0150820 A1 Aug. 14, 2003

Related U.S. Application Data

(63) Continuation of application No. PCT/FR01/02516, filed on Aug. 1, 2001.

(30) Foreign Application Priority Data

Aug. 14, 2000 (FR) .................... 00 10622

(51) Int. Cl.
*B01D 39/06* (2006.01)
*B01D 39/20* (2006.01)
*B01J 21/06* (2006.01)
*B01D 50/00* (2006.01)

(52) U.S. Cl. ............ 210/501; 210/502.1; 210/504; 210/505; 210/506; 210/508; 210/509; 210/496; 502/239; 422/171; 422/177; 422/180; 422/190; 422/222

(58) Field of Classification Search ........ 210/501, 210/502.1, 504, 505, 506, 508; 502/239; 422/171, 177, 180, 190, 211, 222
See application file for complete search history.

(56) References Cited

U.S. PATENT DOCUMENTS

| | | | | |
|---|---|---|---|---|
| 3,149,023 A | * | 9/1964 | Bodendorf et al. | 162/135 |
| 4,285,831 A | | 8/1981 | Yoshida et al. | 252/423 |
| 4,904,343 A | | 2/1990 | Giglia et al. | 162/145 |
| 5,732,718 A | * | 3/1998 | Douglas et al. | 131/342 |
| 5,965,479 A | * | 10/1999 | Suzuki et al. | 502/182 |
| 6,180,548 B1 | * | 1/2001 | Taoda et al. | 501/137 |
| 6,228,480 B1 | * | 5/2001 | Kimura et al. | 428/328 |
| 6,368,668 B1 | * | 4/2002 | Kobayashi et al. | 427/376.2 |
| 6,531,100 B1 | * | 3/2003 | Ogata et al. | 422/177 |
| 6,540,792 B1 | * | 4/2003 | Ishii et al. | 8/115.51 |
| 6,645,388 B2 | * | 11/2003 | Sheikh-Ali | 210/767 |
| 6,746,760 B2 | * | 6/2004 | Minemura et al. | 428/323 |

FOREIGN PATENT DOCUMENTS

| | | |
|---|---|---|
| CA | 2186934 | 4/1998 |
| JP | 03275139 | 12/1991 |
| JP | 07024256 | 1/1995 |
| JP | 11179118 | 7/1999 |
| JP | 11276562 | 10/1999 |
| JP | 11319580 | 11/1999 |
| WO | WO99/ 51345 | 10/1999 |

\* cited by examiner

*Primary Examiner*—Krishnan S. Menon
(74) *Attorney, Agent, or Firm*—Heslin Rothenberg Farley & Mesiti P.C.; Victor A. Cardona, Esq.

(57) ABSTRACT

The invention concerns a filtering medium based on a photocatalytic agent and activated carbon, characterized in that it comprises a permeable support covered with a first layer based on activated carbon, then a separate second layer based on a photocatalytic agent, or vice versa. The invention also concerns a method for making such a filtering medium.

20 Claims, 4 Drawing Sheets

FILTERING MEDIUM, METHOD FOR MAKING SAME

CROSS REFERENCE TO RELATED APPLICATIONS

This application is a continuation of International patent application No. PCT/FR01/02516 filed Aug. 1,2001 and published as Publication No. WO 02/13950 al in French on Feb. 21, 2002, and claims priority from French national application No. 00.10622 filed Aug. 14, 2000 (the contents of these applications being incorporated herein by reference in their entirety).

TECHNICAL FIELD

The invention relates to a filtering medium. It also relates to the method for making said medium. Its object is finally the use of the medium for purifying gaseous or liquid effluents.

BACKGROUND

The so-called "photocatalytic" reaction, also called photocatalysis, consists in destroying the various organic and/or inorganic pollutants present in gaseous effluents, and in particular air, or in liquid effluents by photochemical reaction, which reaction is caused by the irradiation of a photocatalyst with ultraviolet radiation.

Photocatalysis is essentially initiated by activating a semiconductor solid (photocatalytic agent such as for example $TiO_2$) with UV radiation at a wavelength of less than 380 nanometers, causing electron changes in the semiconductor and leading, in the presence of gaseous or liquid effluents, such as air or water, to the creation of oxygenated and hydroxyl radicals at the surface of the semiconductor. These radicals attack the organic compounds adsorbed on the semiconductor and, through a succession of chemical reactions, degrade the compounds up to the final stage of oxidation.

As already stated, as photocatalytic agent capable of triggering the photocatalytic reaction, it is possible to use in particular, but without limitation, titanium dioxide $TiO_2$ anatase, which, activated by UV light, becomes electronically modified in such a manner as to lead to the formation of hydroxyl OH and oxygen O radicals capable of attacking the organic carbon chains adsorbed on $TiO_2$, degrading them until the organic carbon is completely converted to carbon dioxide.

It is possible, however, to envisage other photocatalytic agents such as those in particular forming part of the group consisting of metal oxides, alkaline-earth oxides, actihide oxides and rare-earth oxides. In practice, the photocatalytic agents are attached by means of binding agents to supports, such as in particular natural or synthetic nonwovens, glass fibers or metal or plastic grids.

Particularly advantageous photocatalytic compositions resulting from the mixing of a photocatalytic agent and the binding agent are described in the document WO 99/51345 by the Applicant.

These compositions may be used for the treatment of air. Indeed, air can contain a large number of pollutants, among which $NO_x$, $NH_3$, $H_2S$, CO, $O_3$, chlorinated or nonchlorinated $C_2$-$C_4$ alkenes, chloromethane, isooctane, benzene, toluene, xylene, isopropylbenzene, saturated aliphatic $C_1$-$C_4$ alcohols, methyl mercaptan, chlorophenol, nitrophenol, methyl tert-butyl ether, dimethoxymethane, $C_1$-$C_4$ aldehydes, acetone, formic acid, acetic acid, 2-methylpropanoic acid, dichloroacetyl chloride, dimethylformamide, trimethylamine, acetonitrile, pyridine, methanethiol, dimethyl disulfide.

The photocatalytic compositions may also be used for the treatment of liquid effluents, in particular of water polluted with organic compounds, bacteria, viruses, microbes, and the like.

In the abovementioned document WO 99/51345, the Applicant described a filtering medium for the treatment of air or water, consisting of a support coated with a composition resulting from a mixture of binding agent, photocatalytic agent and activated carbon. As explained in this document, the aim of this type of filtering medium is:

first of all, because of the high specific surface area of activated carbon, to adsorb the polluting agents present in the pollution peaks;

and then, by photocatalytic reaction under ultraviolet radiation, to degrade the pollutants adsorbed on the activated carbon, by desorption onto the photocatalytic agent, thus allowing the regeneration of said carbon.

Although, as indicated, the intimate mixing of activated carbon and a photocatalytic agent makes it possible to increase the life of the medium, saturation of the sites of the activated carbon with the pollutant is inevitably observed because, in particular, the activated carbon present at the surface of the layer prevents the UV radiation from reaching the depth of the photocatalytic agent. In addition, nothing is indicated regarding the mass of the layer of activated carbon and the proportion of activated carbon it incorporates, which is necessary for proper depollution without saturation. In other words, the photocatalytic reaction is not sufficiently effective to allow proper regeneration of the activated carbon, such that it is necessary to replace the medium saturated with its pollutants with fresh medium relatively frequently. Quite obviously, disposal of the filtering medium charged with its pollutants is not without consequence on the environment.

The document JP-11179118 describes a filtering medium in laminated form, resulting from the combination of a layer of activated carbon with a layer of photocatalytic agent. Here again, nothing is indicated relating to the mass of activated carbon-based layer and the proportion of activated carbon necessary to allow effective depollution while avoiding saturating said activated carbon.

SUMMARY OF THE INVENTION

Consequently, the problem which the invention proposes to solve is to develop a novel filtering medium of the type described above, that is to say based on a photo-catalyst agent and activated carbon, which does not exhibit the abovementioned disadvantages, as regards in particular the problem of saturation of activated carbon with the polluting agent.

To do this, the filtering medium based on photocatalytic agent and activated carbon of the invention is characterized in that it comprises a permeable support covered with a first activated carbon-based layer, then a separate second photocatalytic agent-based layer, or vice versa, the mass of the activated carbon-based layer being between 10 and 300 $g/m^2$ and incorporating between 10 and 100% by weight of activated carbon.

The Applicant has indeed observed, surprisingly, that providing the photocatalytic agent and the activated carbon in the form of two separate layers made it possible to increase the efficacy of the photocatalytic reaction generated by the combination of the photocatalytic agent and the UV radiation, in a manner sufficient to allow continuous desaturation, and therefore the endless regeneration of the activated carbon when the mass of the activated carbon-based layer is between 10 and 300 g/m$^2$ and the proportion of activated carbon between 10 and 100% by weight. Consequently, even if the medium had to be removed, because in particular of the aging of the support, it would be with an activated carbon which is desaturated and therefore with no impact on the environment.

Outside the abovementioned ranges, either the filtering medium can no longer effectively fix the pollution peaks (top ranges), or the thickness of said layer becomes too large such that the bottom part, or the top of the layer, depending on the case, becomes inaccessible to the action of the photocatalytic agent (top ranges).

In the remainder of the description and in the claims, the expression "permeable support" denotes a structure which is permeable to air and to liquid effluents provided in the form of a sheet obtained from fibers for textile use, which are natural or chemical, alone or in the form of a mixture, it being possible for this sheet to be a nonwoven, a fabric or even a grid. As fibers entering into the constitution of such a sheet, there are used preferably but without limitation natural fibers, in particular cellulose fibers, cotton fibers, organic chemical fibers, in particular modified cellulose fibers, methylcellulose fibers, rayon fibers, acrylic fibers, nylon fibers, polyester fibers, polyethylene fibers, polypropylene fibers, polyamide fibers, and inorganic chemical fibers, in particular glass fibers and metal fibers.

In a preferred embodiment, the support is provided in the form of a nonwoven based on natural fibers and organic chemical fibers. To increase the mechanical resistance of the support, the support comprises from 40 to 80%, advantageously 50% by weight of cellulose fibers, the balance for 100% consisting of polypropylene fibers.

According to another characteristic of the invention, the mechanical resistance and therefore the mass of the support is variable and in practice between 5 and 150 g/m$^2$ according to the flow of liquid or gaseous effluent.

Activated carbon is well known to persons skilled in the art and may be provided in various forms, in particular in the form of a powder, of fibers or of a perforated sheet, of which the methods of production are more particularly described in the documents US-A-4069297 and US-A-4285831, cited by way of reference. However, it is known that the fibers or the particles of activated carbon have no capacity to bind to each other.

To solve this problem, activated carbon, whether it is in the form of fibers or of particles of activated carbon, is incorporated into a mixture of natural fibers and/or of organic chemical fibers, of the same type as those listed above, the natural or chemical fibers allowing the binding of the fibers and/or particles of activated carbon to each other. In this case, the activated carbon-based layer is provided in the form of a sheet, which sheet is advantageously obtained by the wet route.

In practice, the activated carbon fibers have a length of between 2 and 7 mm, for a diameter of between 10 and 100 micrometers. Likewise, the activated carbon particles are provided in the form of a powder, of which the size of the constituent particles is between 0.1 and 100 micrometers.

In a first embodiment, the activated carbon-based layer consists of a mixture comprising 20 to 75%, advantageously 50% by weight of activated carbon fibers, the balance for 100% consisting of a mixture based on natural fibers and/or organic chemical fibers. For a concentration of less than 20%, the quantity of activated carbon is not sufficient to allow high pollution peaks to be adsorbed. For a concentration of activated carbon fibers greater than 75%, the filtering medium becomes economically less advantageous because of the high cost of the activated carbon fibers.

In a second embodiment, the activated carbon-based layer consists of a mixture comprising 70 to 90%, advantageously 80% by weight of activated carbon particles, the balance for 100% consisting of a mixture based on natural fibers and/or organic chemical fibers. As above, for a concentration of less than 70%, the quantity of activated carbon is not sufficient to allow high pollution peaks to be absorbed. For a concentration of activated carbon particles greater than 90%, the filtering medium becomes less advantageous because of the high cost of activated carbon particles.

Moreover, to improve the cohesion of the natural and/or chemical fibers with the particles and/or fibers of activated carbon, the activated carbon-based layer comprises, in addition, at least one binding agent. Advantageously, the activated carbon-based layer comprises between 1 and 10% by weight, advantageously 5% by weight of modified starch. In the remainder of the description and in the claims, the expression "modified starch" denotes modified starch provided in the form of fibers such as that described in the document EP-A-617742. The Applicant has indeed observed that, quite surprisingly, this starch made it possible to enhance the cohesion of the fibers with each other to such an extent that the thickness of the layer was thereby considerably reduced, with no loss of permeability.

As already stated, the activated carbon may also be provided in the form of a perforated sheet. According to this embodiment, the activated carbon-based layer is provided in the form of an activated carbon fabric whose mesh is between 0.1 and 5 mm, advantageously 2 mm, the fabric being obtained by heating to 900° C. a fabric made from organic chemical fibers.

In general, it is necessary, for the photocatalytic reaction to be initiated, for the majority of the particles of photocatalytic agent to be accessible to UV radiation.

Consequently, when the activated carbon is provided in the form of fibers or particles, the activated carbon-based layer will constitute the first layer, directly in contact with the support, the photocatalytic agent entering into the composition of the second layer. Indeed, under these circumstances, the volume occupied by the activated carbon does not prevent the UV radiation from reaching the photocatalytic agent.

On the other hand, when the activated carbon-based layer is provided in the form of a fabric with a given mesh, the photocatalytic agent may be directly coated onto the support, the activated carbon-based layer constituting the second layer. Indeed, the mesh of the fabric allows the passage of radiation, and therefore its contact with the photocatalytic agent even if the latter is directly coated onto the support. However, and in another embodiment, the activated carbon fabric may be applied directly onto the support, thereby constituting the first layer.

As regards the photocatalytic agent entering into the composition of the photocatalytic agent-based layer, it may be chosen from the group comprising metal oxides, alkaline-earth metal-comprising oxides, actinide oxides and rare earth oxides.

In an advantageous embodiment as described in the document WO 99/51345 by the Applicant, the photocatalytic agent-based layer is provided in the form of a mixture comprising between 10 and 60 parts on a dry basis, advantageously 50 parts, of an aqueous colloidal dispersion of silicon dioxide ($SiO_2$), the balance for 100 parts consisting of $TiO_2$ anatase.

Moreover, to allow effective binding of the $TiO_2$ particles not only to each other, but also to the fibrous cushion constituting the first layer or the support, the $SiO_2$ particles represent from 20 to 50% by weight of the aqueous colloidal dispersion and have a diameter of between 10 and 40 nanometers.

Moreover, for the photocatalytic reaction to be effective and the desorption of the activated carbon to occur uniformly, the photocatalytic agent-based layer comprises between 5 and 40 $g/m^2$, advantageously 20 $g/m^2$ of photocatalytic agent. For a value of less than 5 $g/m^2$, the photocatalytic reaction is reduced, taking into account the excessively small thickness of the layer. By contrast, for a value greater than 40 $g/m^2$, the mass of photocatalytic agent becomes too high, preventing the UV radiation from reaching the particles of photocatalytic agent present at the base of the layer.

Moreover, and in an improved embodiment, in order to increase the photocatalysis yield, the free surface of the support not covered with the two layers is coated with a photocatalytic agent-based layer.

The invention also relates to a method for making the filtering medium described above.

Of course, the method of manufacture will vary according to the structure, not only of the support, but also of the activated carbon-based layer.

According to a first embodiment, the invention relates to a method for making a filtering medium based on a photocatalytic agent and activated carbon according to which, onto a support consisting of a nonwoven based on natural fibers and/or on organic chemical fibers, there are applied a first layer based on natural and/or organic chemical fibers and on fibers and/or particles of activated carbon, and then a second photocatalytic agent-based layer, the mass of the activated carbon-based layer being between 10 and 300 $g/m^2$ and incorporating between 10 and 100% by weight of activated carbon.

According to a first characteristic, the support is made by the wet route on a papermaking machine. Of course, the composition of the support is variable and in particular according to the mechanical resistance and the permeability desired. The supports based on cellulose fibers and on organic chemical fibers of the polypropylene type are preferred.

In the same manner, the first layer is made by the wet route and directly applied to the support, the attachment being obtained upon draining. This method is particularly advantageous since it makes it possible to operate continuously on a papermaking machine, provision being made for a second headbox intended for the preparation of the activated carbon-based suspension. The activated carbon-based layer is then deposited on the wet support, and then upon draining of the water becomes impregnated at the surface of the support. The support/first layer assembly is then dried before being coated with a second photocatalytic agent-based layer. In another embodiment, the first layer is applied to the support by a size press.

The photocatalytic agent-based layer preferably corresponds to the photocatalytic composition described in the abovementioned document by the Applicant.

This second layer may be applied in various ways to give either a layer of uniform thickness or spots of photocatalytic agent. Consequently, and in a first embodiment, the second layer is applied to the first layer by spraying or coating with a size press. In a second embodiment, the second layer is applied with a rotary frame roller, making it possible to obtain spots of photocatalytic agent.

The present invention also relates to a method for making a filtering medium based on a photocatalytic agent and activated carbon according to which, to a support consisting of a nonwoven based on natural fibers and/or on organic chemical fibers, there are applied a first photocatalytic agent-based layer, and then a second layer consisting of an activated carbon fabric, the mass of the activated carbon-based layer being between 10 and 300 $g/m^2$ and incorporating between 10 and 100% by weight of activated carbon.

As above, the support is made by the wet route on a papermaking machine. Of course, the composition of the support is variable and in particular according to the desired mechanical resistance. The supports based on cellulose fibers and on organic chemical fibers of the polypropylene type are preferred.

In the same manner, the first layer is applied to the support by spraying or coating with a size press or a rotary frame roller.

Moreover, and according to another characteristic, the activated carbon fabric is attached to the support coated with the first photocatalytic agent-based layer by any known means, in particular of the needle bonding type. The sewing is advantageously peripheral.

The invention also relates to the use of the filtering medium described above for the treatment of air, but also for the treatment of liquid effluents. The invention and the advantages arriving therefrom will emerge more clearly from the exemplary embodiments which follow in support of the accompanying figures.

DETAILED DESCRIPTION OF THE DRAWINGS

Figure 1:
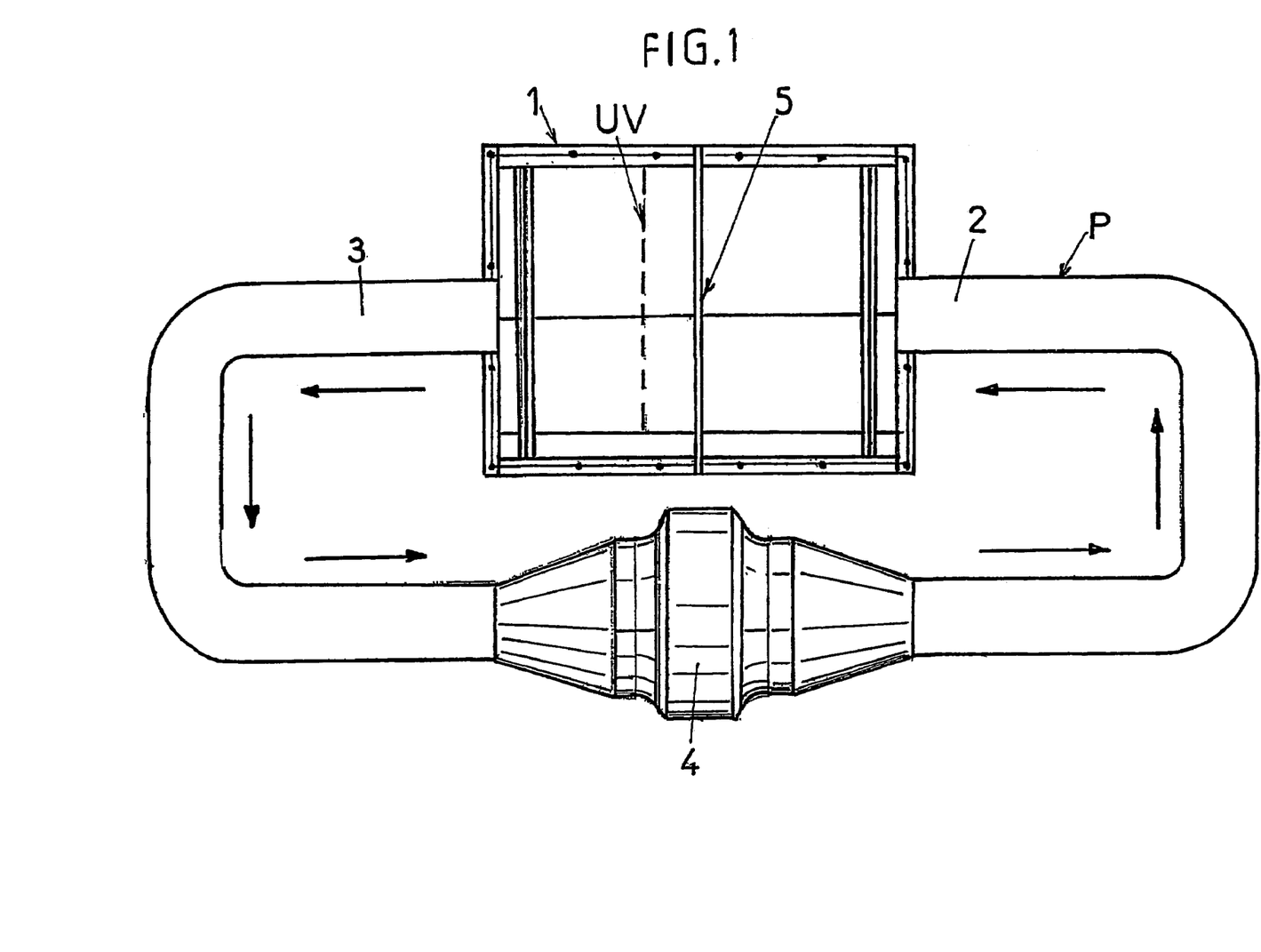
FIG. 1 is a schematic representation of a pilot air treatment.

In FIG. 1, a pilot air treatment has been represented which consists of a 100 liter vessel (1) connected at its two ends to a polluted air inlet pipe (2) and a depolluted air outlet pipe (3). The 2 pipes form a loop and are separated from each other by means of a ventilation system (4). The polluting agent (P) is injected upstream of the vessel (1). The vessel is in addition equipped with a filtering medium (5) positioned perpendicularly to the flow of air and with a source of ultraviolet (UV) radiation, said source being positioned so as to irradiate the surface of the support covered with the photocatalytic composition. Three comparative trials were carried out using this pilot, by injecting into the air circuit a quantity of 400 $mg/m^3$ of toluene. Analysis of the toluene concentration during the treatment is carried out by gas chromatography (GC).

The first trial consists in using, as filtering medium, a nonwoven (40 g/m²) (50% of synthetic polypropylene fibers, Y600 marketed by MITSUI/50% by weight of cellulosic fibers (PENSACOLA, marketed by CHAMPION) coated with a photocatalytic composition based on $TiO_2$ and $SiO_2$ (SNOWTEX 50, marketed by SEPPIC), in an amount of 20 g/m² each.

Figure 2:
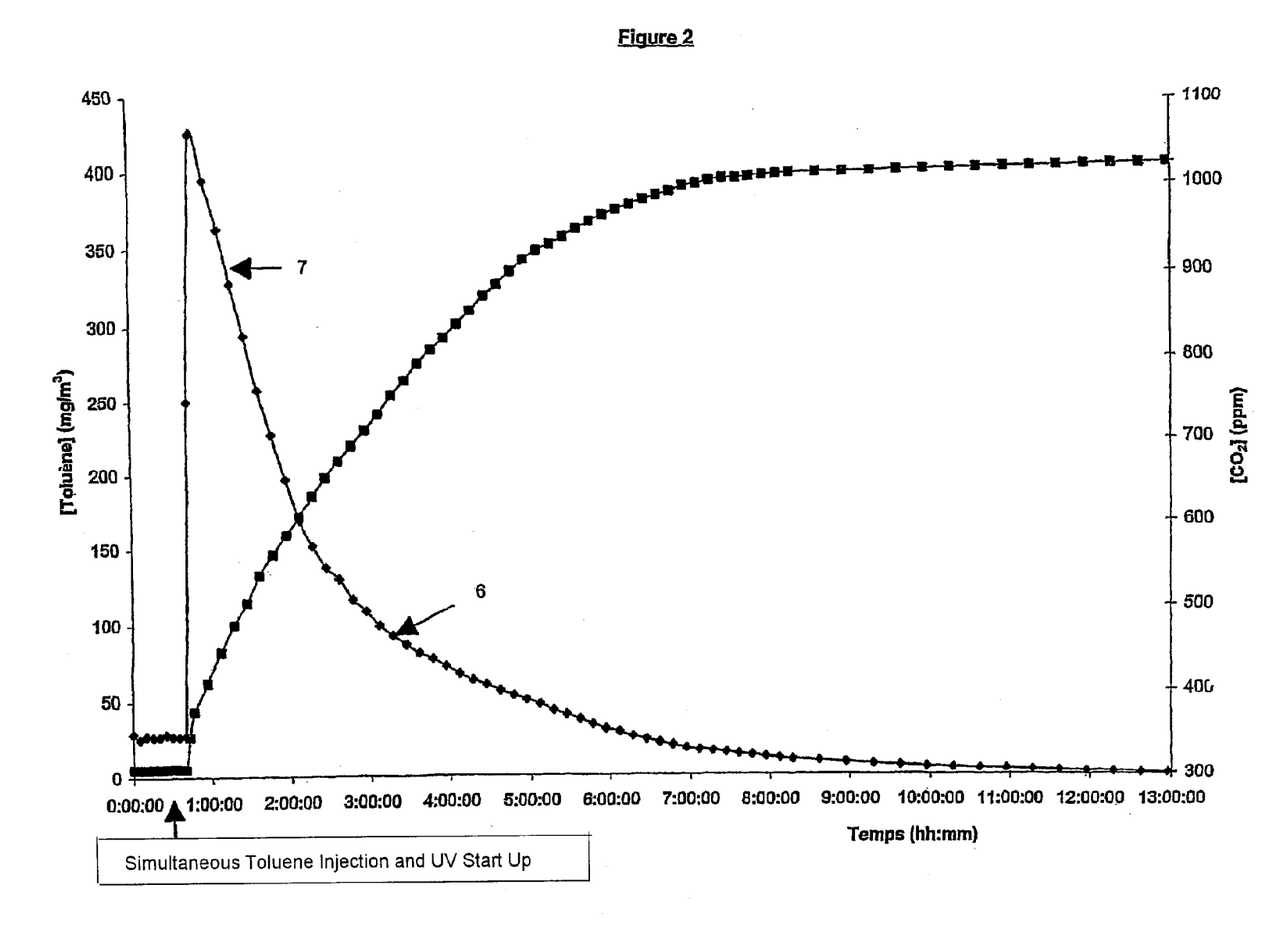
FIG. 2 is a curve representing the degradation, under UV radiation, of a polluting agent as a function of time and the conversion of this agent to $CO_2$ using a filtering medium covered solely with a photocatalytic agent.

In FIG. 2, there has been represented the capacity of the medium and therefore of the photocatalytic composition to degrade the polluting agent as a function of time, under UV radiation. As this figure shows, the concentration of polluting agent decreases slowly (curve 6), converting at the same rate to $CO_2$ (curve 7). After 12 hours of operation of the loop, the entire polluting agent is degraded and converted to $CO_2$.

The second and third trials consist in using the filtering medium of the invention as filtering medium. This medium is made in the following manner.

On a papermaking machine with two headboxes, there is produced, by the wet route, from the first box, a support consisting of a fibrous mixture in an amount of 30 g/m² on a dry basis comprising (50% of synthetic polypropylene fibers, Y600 marketed by MITSUI/50% by weight of cellulosic fibers (PENSACOLA, marketed by CHAMPION)).

To this support, there is applied, by means of the secondary box, a fibrous sheet in an amount of 70 g/m² consisting of 71% by weight of activated carbon fibers which is marketed by SOFRANCE, whose length is between 2 and 7 mm, and the diameter between 10 and 100 micrometers, and 21% by weight of a mixture of natural fibers PENSACOLA, which is marketed by CHAMPION and 8% modified starch marketed by BEGHIN SAY under the trademark CHART BI.

A photocatalytic composition, consisting of a mixture of $TiO_2$ (marketed by MILLENIUM) and an aqueous dispersion of silicon dioxide (SNOWTEX 50, marketed by SEPPIC) in an amount of 20 g/m² each, is then coated using a rotary frame.

Figure 3:
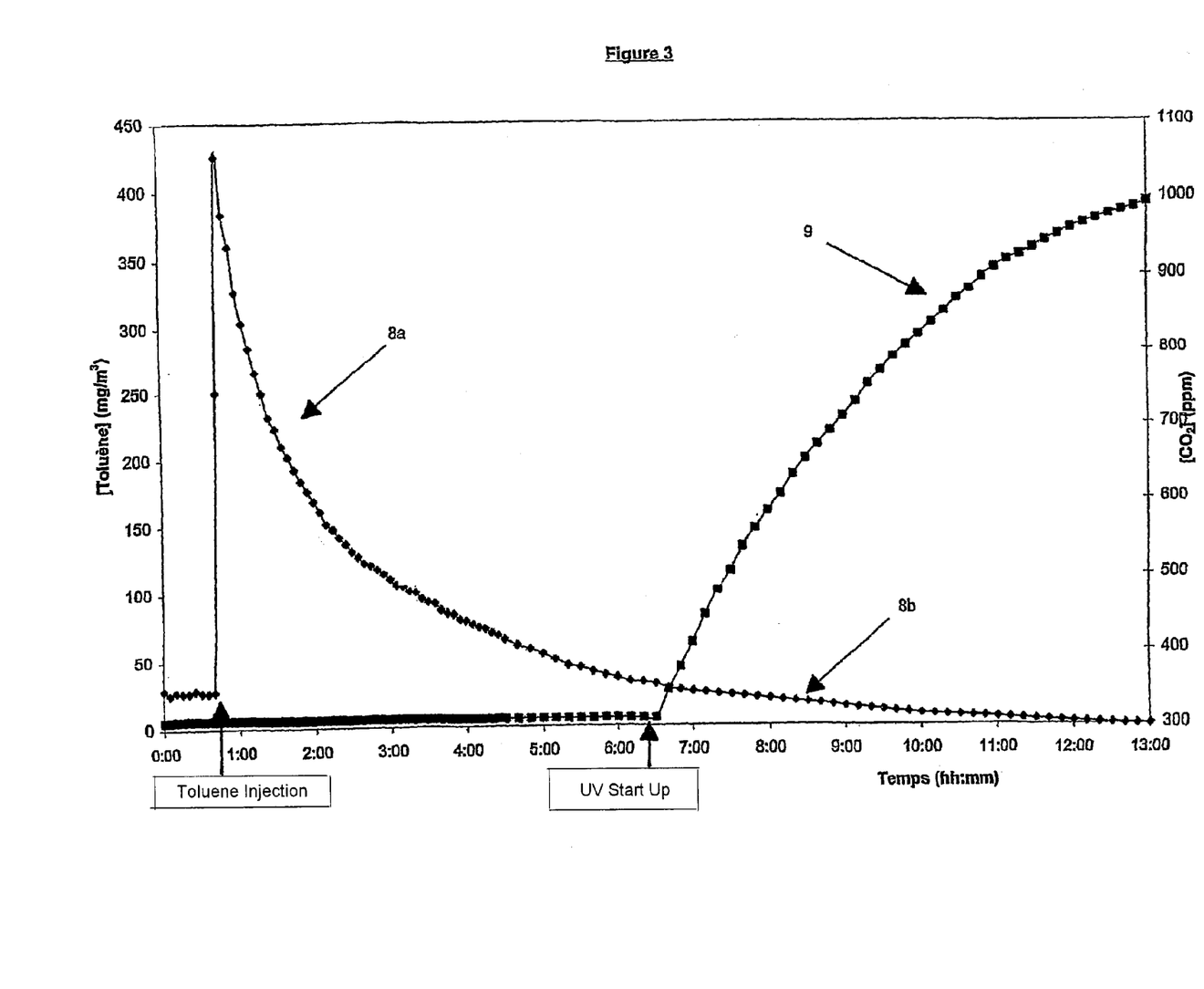
FIG. 3 is a curve representing the degradation of a polluting agent and the conversion of this agent to $CO_2$ as a function of time using the filtering medium of the invention without and then under UV radiation.

In FIG. 3, there has been represented the level of degradation of the polluting agent (curve 8a, 8b) and its conversion to $CO_2$ (curve 9) as a function of time, first without UV radiation, and then under UV radiation.

As this figure shows, between the moment the polluting agent is injected into the system and that when the UV lamps are connected to a source of current, the concentration of polluting agent decreases fairly rapidly (curve 8a) corresponding to the adsorption of the polluting agent onto the sites of the activated carbon and, for a smaller portion, onto those of $TiO_2$. When the UV lamps are connected to a source of current, the degradation of the pollutant continues (curve 8b), corresponding to the photocatalysis reaction. In parallel, emission of $CO_2$ (curve 4), derived from the conversion of the polluting agent, is observed.

Figure 4:
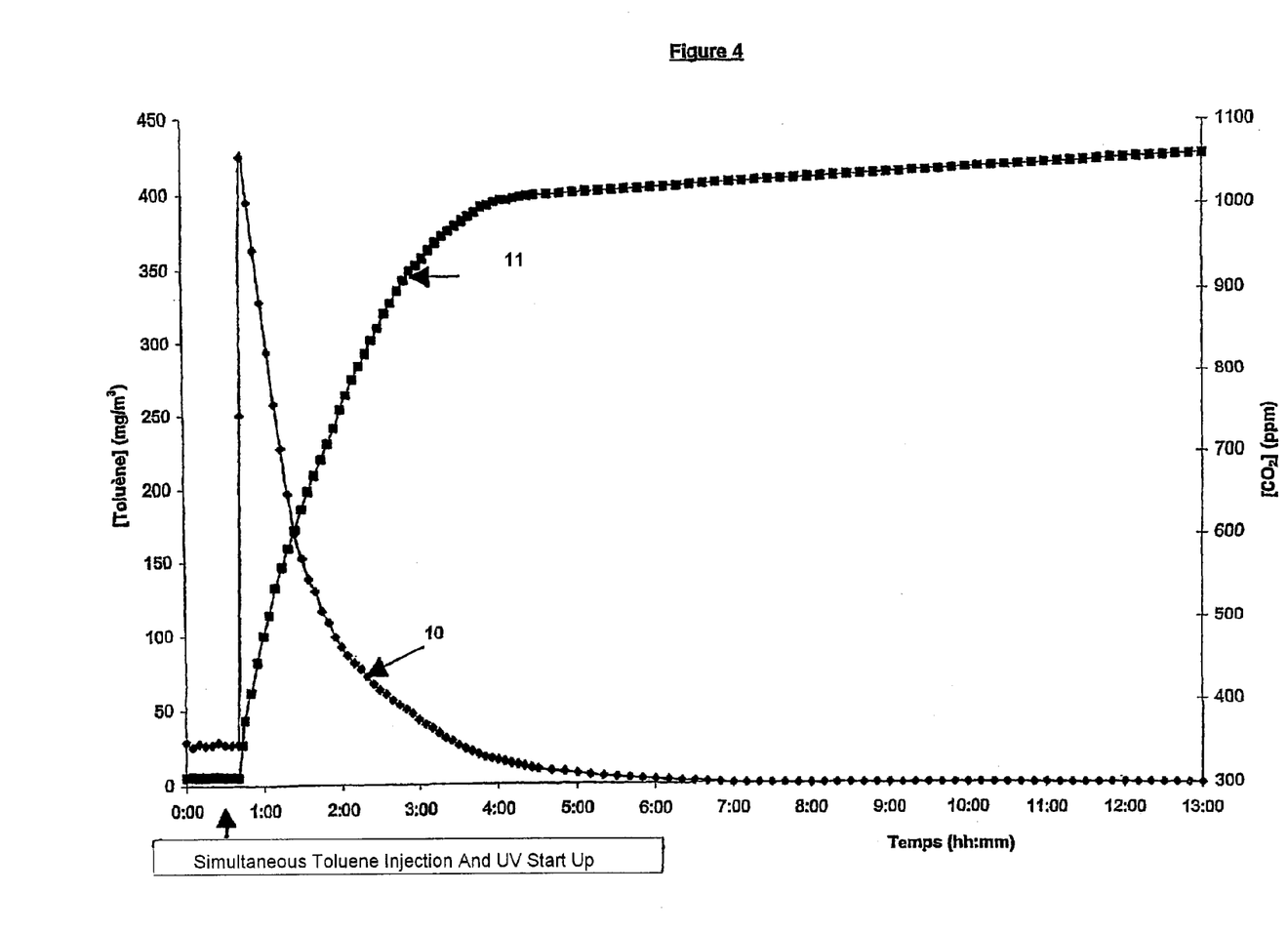
FIG. 4 is a curve representing the degradation, under UV radiation, of a polluting agent and the conversion of this agent to $CO_2$ as a function of time using the filtering medium of the invention.

In FIG. 4, there has been represented the level of degradation of the polluting agent (curve 10) and its conversion to $CO_2$ (curve 11) as a function of the time under radiation.

As this figure shows, the degradation of the polluting agent (curve 10) is at the start very rapid since the pollutant adsorbed onto the sites of activated carbon is simultaneously degraded to $CO_2$ by photocatalysis (curve 11). The carbon sites are continuously desbrbed, making it possible to accelerate the depollution. Accordingly, it is observed that the filtering medium of the invention makes it possible to treat, under UV radiation, the same concentration of polluting agent in practically half the time (7 hours) as without radiation (see FIG. 2).

The invention and its advantages will emerge clearly from the preceding description. There will be noted in particular the improved rate of depollution of the filtering medium of the invention compared with a medium solely based on a photocatalytic agent. Another advantage consists in the nonsaturation of the sites of the activated carbon by the polluting agent, allowing continuous regeneration of said activated carbon.

The invetion claimed is:

1. A filtering medium based on a photocatalytic agent and activated carbon, comprising a permeable support in the form of a non-woven based on natural fibers and/or organic chemical fibers covered with a first activated carbon-based layer comprising at least 20% by weight of activated carbon, an exposed outer surface only of said activated carbon-based layer being directly covered by a separate second layer consisting of 5 to 40 g/m² of photocatalytic agent and a colloidal dispersion of $SiO_2$, the colloidal dispersion of $SiO_2$ effectively binding particles of said photocalalytic agent to each other and to the first layer, said first layer comprising a fibrous cushion, wherein the mass of the activated carbon-based layer is between 10 and 300 g/m² and said activated carbon-based layer comprises a homogeneous mixture of either from 20 to 75% by weight of activated carbon fibers or from 70 to 90% by weight of activated carbon particles, whereby continuous desaturation of the activated carbon is achieved; and
   an outermost exposed surface consisting of an outer surface of said second layer.

2. The filtering medium as claimed in claim 1, wherein the support comprises from 40 to 80% by weight of cellulose fibers, the balance for 100% consisting of polypropylene fibers.

3. The filtering medium as claimed in claim 1, wherein the support has a mass of between 5 and 150 g/m².

4. The filtering medium as claimed in claim 1, wherein the activated carbon-based layer is provided in the form of a sheet comprising a mixture of natural and/or organic chemical fibers and said fibers and/or particles of activated carbon.

5. The filtering medium as claimed in claim 4, wherein the activated carbon-based layer comprises, a mixture of 50% by weight of activated carbon fibers, the balance for 100% comprising a mixture based on natural fibers and/or organic chemical fibers.

6. The filtering medium as claimed in claim 4, wherein the activated carbon-based layer comprises a mixture of 80% by weight of activated carbon particles, the balance for 100% comprising a mixture based on natural fibers and/or organic chemical fibers.

7. The filtering medium as claimed in claim 4, wherein the activated carbon-based layer further comprises from 1 to 10% by weight of modified starch.

8. The filtering medium as claimed in claim 1, wherein the activated carbon-based layer is provided in the form of an activated carbon fabric whose mesh is between 0.1 and 5 mm.

9. The filtering medium as claimed in claim 1, wherein the second layer consists of between 10 and 60 parts, on a dry basis, of said colloidal dispersion of silicon dioxide, the balance for 100 parts consisting of $TiO_2$ anatase.

10. The filtering medium as claimed in claim 9, wherein the particles of $SiO_2$ represent from 20 to 50% by weight of the aqueous colloidal dispersion and have a diameter of between 10 and 40 nanometers.

11. The filteringmedium as claimed in claim 1, wherein the second layer consists of 20 g/m² of photocatalytic agent.

12. The filtering medium as claimed in claim 1, wherein a free surface of the support is coated with a photocatalytic agent-based layer.

13. The filtering medium as claimed in claim 2, wherein the support comprises 50% by weight of cellulose fibers.

14. The filtering medium as claimed in claim 7, wherein the activated carbon-based layer comprises 5% by weight of modified starch.

15. The filtering medium as claimed in claim 8, wherein the mesh of the fabric is 2 mm.

16. The filtering medium as claimed in claim 1, wherein the second layer consists of 50 parts, on a dry basis, of said colloidal dispersion of silicon dioxide, the balance for 100 parts consisting of $TiO_2$ anatase.

17. A filtering medium based on a photocatalytic agent and activated carbon, comprising a permeable support in the form of a non-woven based on natural fibers and/or organic chemical fibers covered with a first layer consisting of 5 to 40 $g/m^2$ of photocatalytic agent, said photocatalytic agent layer being directly covered by a second separate activated carbon-based perforated layer comprising at least 20% by weight of activated carbon, said photocatalytic agent and a colloidal dispersion of $SiO_2$, the colloidal dispersion of $SiO_2$ effectively binding particles of said photocatalytic agent to each other and to said second layer, said second layer comprising a fibrous cushion, wherein the mass of the activated carbon-based layer is between 10 and 300 $g/m^2$ and said activated carbon-based layer comprises a homogeneous mixture of either from 20 to 75% by weight of activated carbon fibers or from 70 to 90% by weight of activated carbon particles, whereby continuous desaturation of the activated carbon is achieved; and an outermost exposed surface consisting of an outer surface of said second layer.

18. The filtering medium of claim 1 wherein the second layer is coated on the first layer.

19. The filtering medium of claim 17 wherein the second layer is attached to the first layer.

20. The filtering medium of claim 19 wherein the second layer is attached to the support by needle bonding.

* * * * *

UNITED STATES PATENT AND TRADEMARK OFFICE
CERTIFICATE OF CORRECTION

PATENT NO. : 7,278,542 B2  Page 1 of 1
APPLICATION NO. : 10/365138
DATED : October 9, 2007
INVENTOR(S) : Dussaud et al.

It is certified that error appears in the above-identified patent and that said Letters Patent is hereby corrected as shown below:

In the claims:

Column 8, line 19; delete "photocalalytic" and insert -- photocatalytic --

Column 8, line 42; delete "," after --comprises--

Column 8, line 66; delete "filteringmedium" and insert -- filtering medium --

Signed and Sealed this

Eighteenth Day of December, 2007

JON W. DUDAS
*Director of the United States Patent and Trademark Office*